United States Patent
Watanabe et al.

(10) Patent No.: US 7,140,855 B2
(45) Date of Patent: Nov. 28, 2006

(54) INNER MANDREL

(75) Inventors: Koji Watanabe, Kumamoto (JP);
Shinji Murakami, Yatsushiro (JP);
Hisashi Kojoh, Yatsushiro (JP)

(73) Assignee: Kohjin Co., Ltd., Tokyo (JP)

( * ) Notice: Subject to any disclaimer, the term of this patent is extended or adjusted under 35 U.S.C. 154(b) by 0 days.

(21) Appl. No.: 10/503,053

(22) PCT Filed: Jan. 21, 2003

(86) PCT No.: PCT/JP03/00452

§ 371 (c)(1),
(2), (4) Date: Jul. 30, 2004

(87) PCT Pub. No.: WO03/064137

PCT Pub. Date: Aug. 7, 2003

(65) Prior Publication Data

US 2005/0100623 A1 May 12, 2005

(30) Foreign Application Priority Data

Feb. 1, 2002 (JP) .............................. 2002-025866

(51) Int. Cl.
*B28B 5/00* (2006.01)
(52) U.S. Cl. .................. 425/71; 425/326.1; 425/378.1; 264/180; 264/560

(58) Field of Classification Search .................. 425/71, 425/326.1, 378.1; 264/180, 560
See application file for complete search history.

(56) References Cited

U.S. PATENT DOCUMENTS

| 3,685,576 | A | 8/1972 | North |
| 3,725,519 | A | 4/1973 | Selfried et al. |
| 5,593,703 | A | 1/1997 | Mizutani et al. |

FOREIGN PATENT DOCUMENTS

| JP | 62-6489 | 2/1987 |
| JP | 6-47795 | 2/1994 |

*Primary Examiner*—Joseph S. Del Sole
*Assistant Examiner*—Maria Veronica Ewald
(74) *Attorney, Agent, or Firm*—Antonelli, Terry, Stout and Kraus, LLP.

(57) ABSTRACT

An internal mandrel for cooling a tubular thin film is disclosed where an air layer is eliminated in the lower side cooler of the internal mandrel, so that the tubular thin film can be continuously and stably produced. In the internal mandrel for directly cooling the tubular thin film while using external circularly shaped cooling tank where the tubular thin film is downwardly extruded through a circular slit of the die, the internal mandrel is characterized in that coolant for cooling a lower most part of the internal mandrel is flown in the countercurrent direction in the internal mandrel to the tubular thin film.

6 Claims, 4 Drawing Sheets

INNER MANDREL

TECHNICAL FIELD

This invention relates to an internal cooling mandrel capable of cooling at very high speed a tubular molten thin film extruded from an annular die of an extruding machine by bringing the thin film into direct contact with the interior, when a tubular thin film or a sheet is made from thermoplastic resin.

BACKGROUND ART

Conventionally, various types of apparatuses have been provided for cooling an extruded thin film by bringing it into direct contact with coolant in the process of making a tubular thin film from thermoplastic resin.

For example, the following are known: quenched solidification method through direct pressure against and retention of overflow liquid flowing down on the outer wall of internal overflow pipe (Japanese Examined Patent Publication No. 35192/1970); the method of improving accelerated film production by providing a helical channel through which coolant flows in the lower part of double tube for pipe size control through which overflow liquid flows down (Japanese Examined Patent Publication No. 31473/1971); the method of cooling and solidifying through contact with coolant and of removing by absorbing adhesive liquid (Japanese Examined Patent Publication No. 2072/1964); and an internal mandrel for a cooling tubular thin film that is provided with more than one stage of an upper annular slit nozzle for jetting coolant (Japanese Unexamined Patent Publication No. 47795/1994).

The most important technical point for producing thin film that has excellent extensibility and long-term stability lies in how to manufacture substantially formless thin film in continuous and stable manner. This is important, in particular, in film production equipment of tubular method that uses an internal cooling mandrel, and determines efficiency of the entire equipment and production quality of a tubular thin film and of a sheet.

The inventors precedently proposed the multi-stage cooling that could enhance cooling ability and significantly improve accelerated film production (Japanese Unexamined Patent Publication No. 47795/1994). Although this enabled substantially accelerated production of a tubular molten thin film, it has a disadvantage that further acceleration will increase air entrained with the thin film or coolant, thus leading to increased air quantity contained in the coolant, which results in accumulation of air space in the lower part of the pipe size control ring.

This air space adversely affects moldability of molten thin film. More specifically, although molten thin film achieves a balance by head pressure of an external water tank and hydraulic pressure of internal coolant, when the said air space gets off balance and the balance disproportionates, the air space passes between the thin film and the tubular control ring, reaches an annular nozzle for jetting coolant in the upper part, bursts in an area where the molten thin film enters the coolant and causes cooling irregularity of the thin film or pores.

These problems have considerable effect on the entire equipment, such as reduced runnability due to inability of continuous drawing, and deteriorated quality of the tubular thin film or sheet due to cooling irregularity.

In the following, we describe a conventional cooling mandrel in detail with reference to the attached drawings.

FIG. 4 is a detailed illustration of a cooling unit of the conventional cooling mandrel.

Conventionally, an inner surface of an tubular thin film 4 is cooled by internal coolant and coolant from an external cooling tank 22 that are uniformly distributed by a helical channel 9 provided in the lower cooling unit 10.

The tubular thin film then cooled down achieves a balance by internal pressure of the lower coolant and head pressure of the external cooling tank, and enters a seal ring unit 15 without contacting the helical channel 9 of the lower cooling unit 10, or without separating from the bottom of a pipe size control ring unit 6.

However, as film production is accelerated, air entrained with the molten tubular thin film 4 or contained in the coolant from an upper annular nozzle for jetting coolant 8, a middle annular nozzle for jetting coolant 7 and the lower cooling unit 10 also increases.

During film production the air stays as air space 12 in the bottom of the tubular control ring unit 6. Although the coolant running through the helical channel 9 in the lower cooling unit 10 is drained from a lower exhaust port 14, the air space 12 residing in the bottom of the tubular control ring unit 6 expands as film production time passes, rather than being vented to the lower exhaust port 14.

In the internal cooling mandrel, the air space 12 destroys the balance between the internal pressure of the lower coolant and the head pressure of the external cooling tank 22 in the lower cooling unit 10, and rises as bubble to the middle annular nozzle for jetting coolant 7 or the upper annular nozzle for jetting coolant 8, through a gap between the tubular thin film and the pipe size control ring unit 6. Then, as the air space 12 rising as bubble bursts in the vicinity of the upper or middle annular nozzle unit for jetting coolant, the molten tubular thin film 4 suffers from uneven thickness due to irregular cooling or generation of pores.

DISCLOSURE OF INVENTION

In order to solve said disadvantages, the inventors achieved the present invention as a result of elaborate review of a internal cooling mandrel.

More specifically, the invention provides:

(1) an internal mandrel for cooling tubular thin film, characterized in that internal coolant of the lowest stage is run to the tubular molten thin film in the countercurrent direction in the internal mandrel for direct cooling, coupled to the lower part of an annular extrusion die for thermoplastic resin, that cools down from inside the molten tubular thin film extruded downward from an annular slit of the die, together with an external annular cooling tank, and (2) the internal mandrel for cooling tubular thin film as of (1) above, characterized in that in a drainage unit of the lowest stage coolant, an annular ring for exhaust port regulation regulates the volume of drainage and pressure.

The characteristic of this invention lies in the internal mandrel wherein no air space is formed in the bottom of the tubular control ring, by running the lowest stage coolant upward and directing the coolant in the direction of the rising air space.

This could successfully prevent uneven thickness or pores of the thin film due to irregular cooling and significantly improve accelerated stable film production performance.

This invention can be applied as a lowest stage unit of a multi-stage mandrel comprising a series of an upper annular nozzle for jetting coolant and middle annular nozzle for jetting coolant, or a mandrel comprised of a single upper annular nozzle for jetting coolant.

BEST MODE FOR CARRYING OUT THE INVENTION

In the following, embodiments of this invention are described in detail with reference to the drawings.

Figure 1:
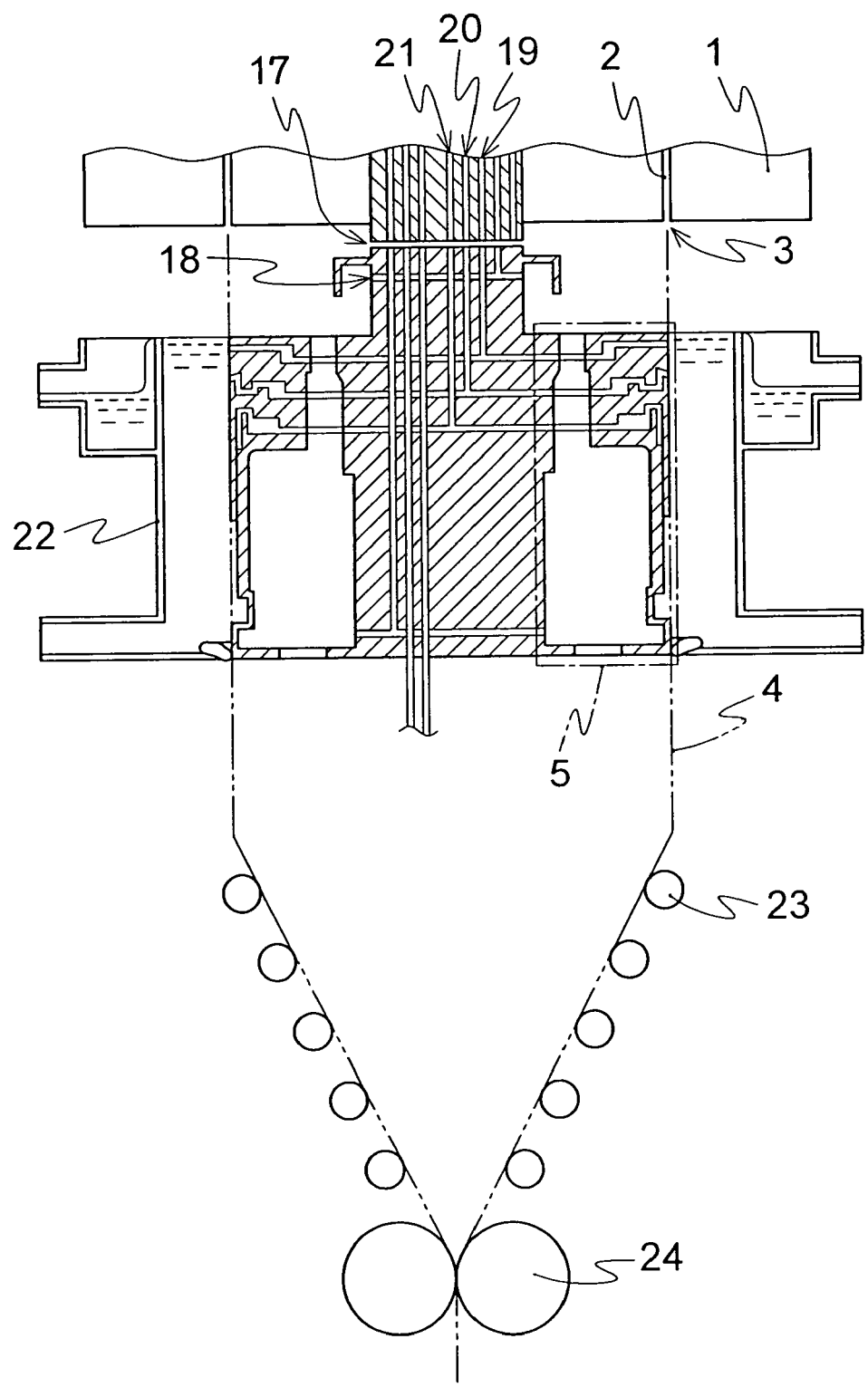
FIG. 1 is a schematic view of the entire structure of the internal mandrel according to one aspect of this invention.
Figure 2:
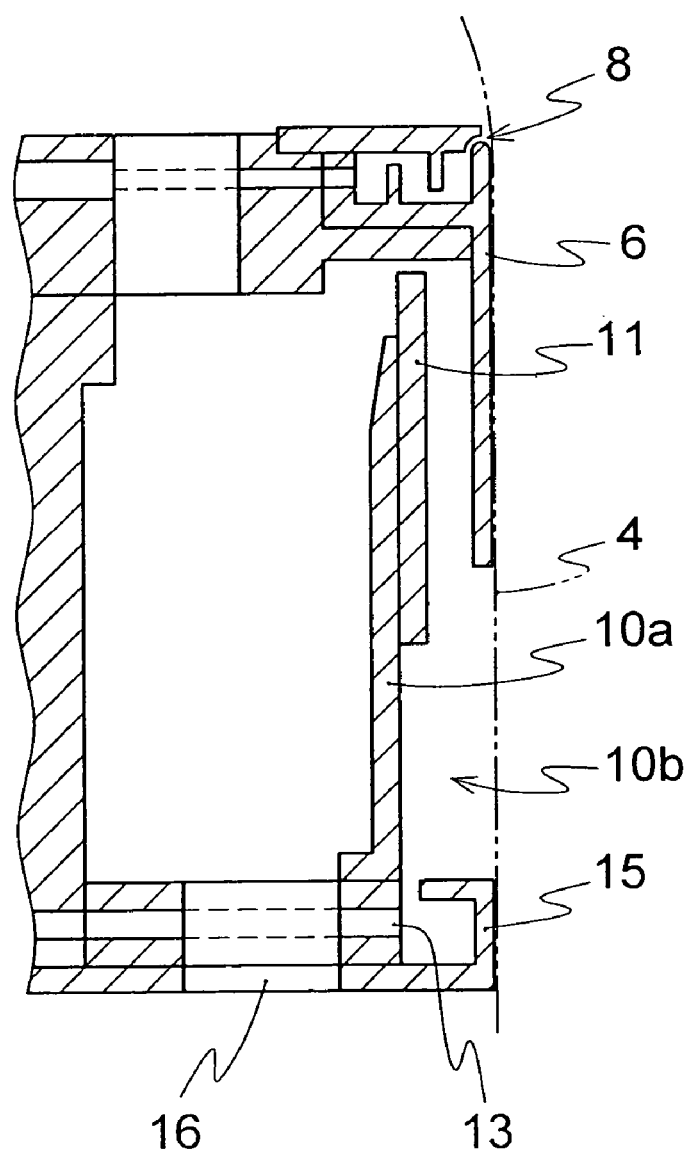
FIG. 2 is a detailed illustration of the cooling unit of the internal mandrel according to one aspect of this invention.
Figure 3:
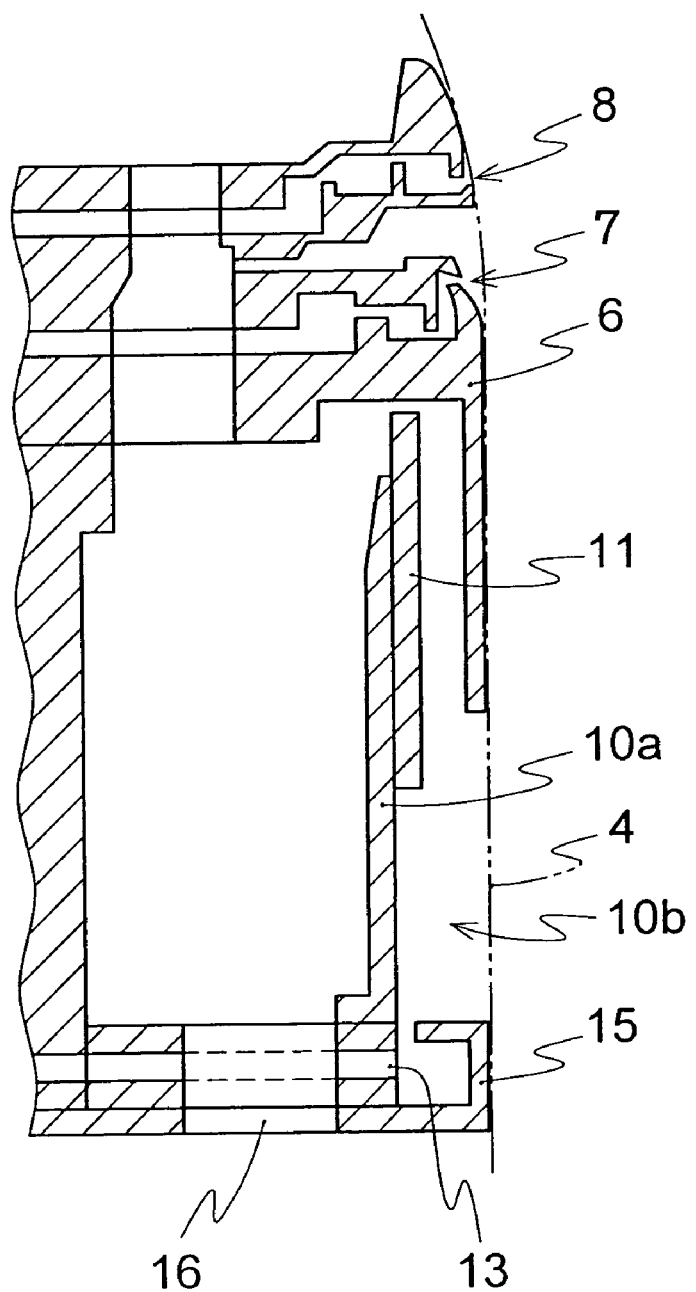
FIG. 3 is a detailed illustration of the cooling unit of the internal mandrel according to another aspect of this invention.

FIG. 1 is an illustration of the entire structure of an internal mandrel according to one aspect of the invention, and FIG. 2 is a detailed illustration of a cooling unit of the internal mandrel.

Reference numeral 1 designates an annular die attached to an extruding machine with the bottom up, and molten thermoplastic resin passing through resin passage 2 inside the die is tubularly extruded downward from an annular slit 3 by the extruding machine. Reference numeral 5 designates the internal cooling mandrel suspended from the annular die. The internal cooling mandrel 5 is shaped almost like a cylinder mainly composed of the following six components: a pneumatic jet nozzle unit 18, upper annular nozzle for jetting coolant 8, middle annular nozzle for jetting coolant 7, a pipe size control ring unit 6, a lower cooling unit inner cylinder 10a, and seal ring unit 15.

In the uppermost part of the internal cooling mandrel 5 are provided the pneumatic jet nozzle 18 for keeping the shape of said bubble, and an air exit 17 for exhausting generated gas, etc. The shape of upper bubble that a molten thin film 4 defines between the annular die 1 and the internal cooling mandrel 5 is maintained by a balance among pressure air exhausted from a coolant exhaust port 16, pressure air exhausted from said air exit 17, and pressure air supplied from the pneumatic jet nozzle 18.

Below the pneumatic jet nozzle 18 are provided the upper annular nozzle for jetting coolant 8 and the middle annular nozzle for jetting coolant 7. Cooled down by the coolant from the upper annular nozzle for jetting coolant 8 and the middle annular nozzle for jetting coolant 7, the molten annular thin film 4 is shaped into an uniform cylindrical thin film by the pipe size control ring 6 and further proceeds to the lower cooling unit 10b.

In the internal cooling mandrel 5 of the invention (FIG. 2), the lower cooling unit inner cylinder 10a is provided below the pipe size control ring 6, and the lower coolant outflows upward of the lower cooling unit 10b from a lower coolant nozzle 13 provided radially from the side of the seal ring unit 15.

In addition, at the top of the lower cooling unit inner cylinder 10a is provided an annular ring for exhaust port regulation 11 that has a screw structure, whereby with the tubular thin film interposed, the internal pressure of the lower coolant can be adjusted so that it achieves a balance with a head pressure difference of the coolant in the external cooling tank 22. In other words, the lower coolant forms countercurrent against the molten tubular thin film 4 and overflows from the upper part of the annular ring for exhaust port regulation 11.

In the case of the internal cooling mandrel with this structure, even though in accelerated film production air entrained with the molten tubular thin film 4 or from the upper annular nozzle for jetting coolant 8 or middle annular nozzle for jetting coolant 7 and air contained in the coolant in the lower cooling unit 10b increases, the air inflowing every time the lower coolant flows upward is vented from the exhaust port above the annular ring for exhaust port regulation 11 to the coolant exhaust port 16. Thus, no air space is present beneath the pipe size control ring 6, and said air space bubbles and bursts, thereby eliminating the problems of uneven thickness of the molten thin film 4 or generation of pores due to irregular cooling.

This invention is further elaborated by the following embodiments, but is not limited to them.

Embodiment 1

At resin temperature of 260° C., nylon was extruded from an annular die having an annular slit with an extrusion bore of 550 mmφ into molten tubular thin film. The film went through the external diameter of the internal cooling mandrel 5 having the shape as shown in FIG. 1 and was folded by a group of folding rolls 23. Then, the produced film was taken up by a take-up nip roll 24 at 40 m/min.

In the internal cooling mandrel used herein, the largest diameter of the shoulder of the pipe size control ring 6 as shown in FIG. 2 was 548 mmφ, that of the seal ring was 548 mmφ, and that of the annular ring for exhaust port regulation of the lower cooling unit inner cylinder 10a was 500 mmφ.

In addition, ground water of 20° C. was supplied to the internal upper coolant introduction hole 19 at 2.3 t/hour and to the middle coolant introduction hole 20 at 1.0 t/hour.

Ground water of 20° C. similarly supplied to the lower coolant introduction hole 21 at 3.0 t/hour was let out from a clearance of 1.0 mm between the annular ring for exhaust port regulation 11 and the bottom of the pipe size control ring 6, and discharged to the coolant exhaust port 16.

In addition, ground water of 20° C. was supplied to the external cooling tank 22 at the flow rate of 4.5 t/hour to externally cool down the thin film 4.

The range of thin film having average thickness of 145 μm obtained as described above was 10 μm, and it had excellent planarity and transparency.

Further, even when 48 hours passed after start of the operation, there was no trouble due to staying air space and performance of the above thin film was stable.

Comparative Example 1

Figure 4:
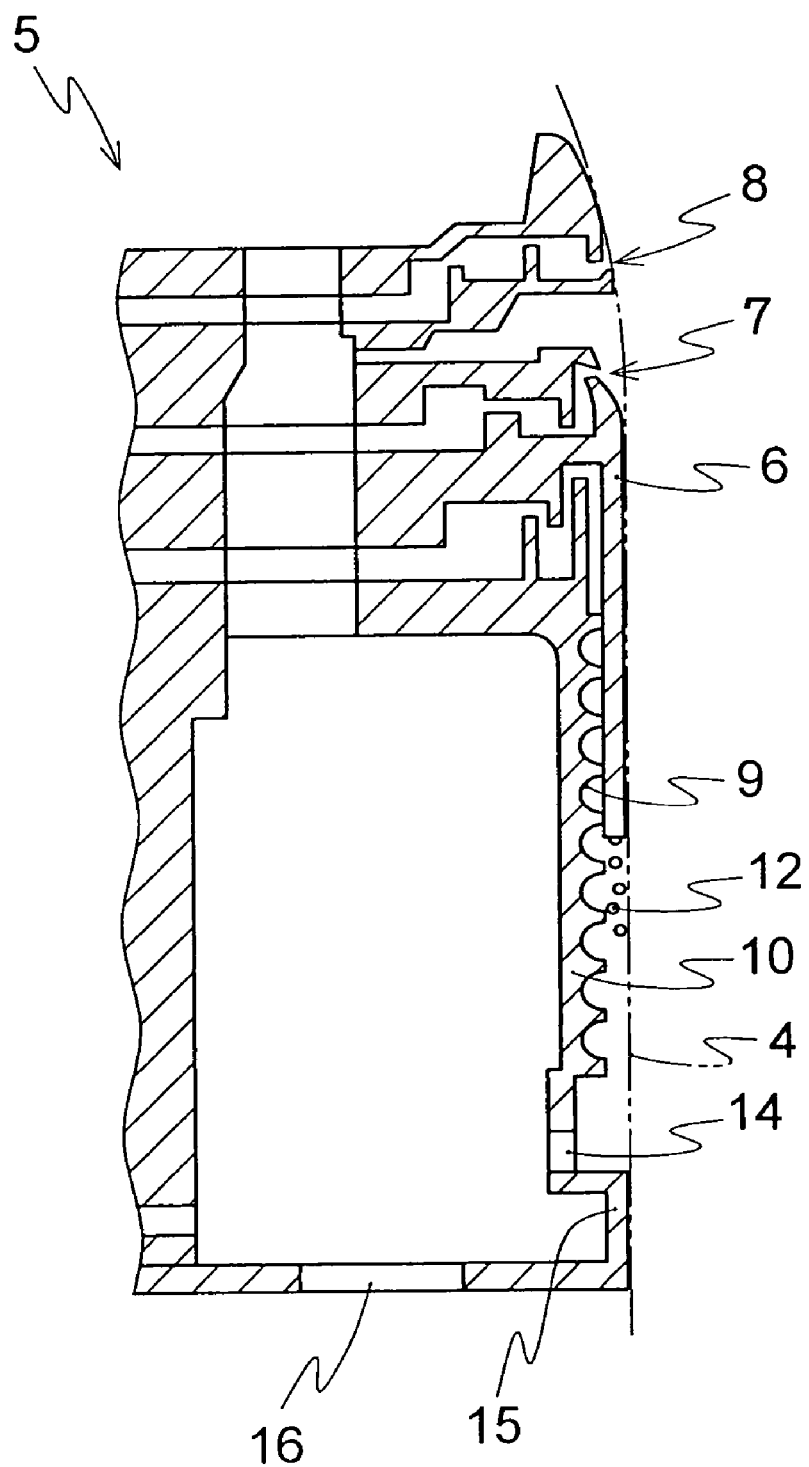
FIG. 4 is a detailed illustration of the conventional internal cooling mandrel.

Instead of the lower cooling unit inner cylinder 10a shown in FIG. 2 of the embodiment 1, the conventional lower cooling unit 10, FIG. 4, was used in the configuration. The tubular thin film 4 was cooled down under the same conditions, except for this. When 10 hours passed after start of the operation, uneven thickness due to the air space occurred. In addition, after 40 hours, pores due to the air space were observed on the tubular thin film 4, which made it impossible to continue drawing.

INDUSTRIAL APPLICABILITY

As described thus far, even in accelerated film production operation, the internal mandrel of the invention can prevent a trouble due to air space by eliminating the air space residing in the lower part of the tubular control ring and makes it possible to produce tubular thin film with uniform thickness and good planarity for a long stretch of time.

Therefore, in film production equipment of tubular method that uses the internal cooling mandrel, the invention makes a great contribution to efficiency of the entire equipment and the production quality of tubular thin film and sheet.

The invention claimed is:

1. An internal mandrel for cooling tubular thin film together with an external annular cooling tank, the internal mandrel comprising:
   more than one cooling stage for cooling down from the inside molten tubular thin film coupled to the downside of an annular extrusion die from which the tubular thin film is extruded downward from an annular slit of the annular extrusion die; and
   a pipe size control ring for shaping the molten annular thin film into a uniform cylindrical thin film;
   wherein internal coolant of the lowest cooling stage of said more than one cooling stage is run to the tubular molten thin film in the countercurrent direction in the internal mandrel for direct cooling of the molten tubular thin film, wherein said lowest cooling stage is located below said pipe size control ring.

2. The internal mandrel for cooling tubular thin film of claim 1, further comprising a drainage unit in the lowest cooling stage, the drainage unit including an annular ring for exhaust port regulation that regulates the volume of drainage and pressure.

3. An internal mandrel for cooling tubular thin film together with an external annular cooling tank, the internal mandrel comprising:
   more than two cooling stages for cooling down from the inside molten tubular thin film coupled to the downside of an annular extrusion die from which the tubular thin film is extruded downward from an annular slit of the annular extrusion die;
   a pipe size control ring for shaping the molten annular thin film into a uniform cylindrical thin film; and
   more than one nozzle for jetting coolant, wherein an uppermost of said more than one nozzle is located above said pipe size control ring;
   wherein internal coolant of the lowest cooling stage of said more than two cooling stages is run to the tubular molten thin film in the countercurrent direction in the internal mandrel for direct cooling the molten tubular thin film, and wherein said lowest cooling stage is located below said pipe size control ring.

4. The internal mandrel for cooling tubular film of claim 3, further comprising a drainage unit in the lowest cooling stage, the drainage unit including an annular ring for exhaust port regulation that regulates the volume of drainage and pressure.

5. An internal mandrel for cooling tubular thin film together with an external annular cooling tank, the internal mandrel comprising:
   more than one nozzle for jetting coolant;
   a pipe size control ring being located below said more than one nozzle;
   a lower cooling unit with an inner cylinder being located below said pipe size control ring; and
   a lower coolant nozzle being located below said lower cooling unit inner cylinder;
   wherein internal coolant of the lower cooling unit is run from said lower coolant nozzle to the tubular molten thin film in the countercurrent direction in the internal mandrel for direct cooling the molten tubular thin film, and wherein said lower cooling unit is located below said pipe size control ring.

6. The internal mandrel for cooling tubular thin film of claim 5, further comprising a drainage unit in the lower cooling unit, the drainage unit including an annular ring for exhaust port regulation that regulates the volume of drainage and pressure.

* * * * *